United States Patent [19]
Culbertson

[11] Patent Number: 5,918,931
[45] Date of Patent: Jul. 6, 1999

[54] BICYCLE SADDLE

[76] Inventor: Russell D. Culbertson, 2506 Cascade Dr., Austin, Tex. 78757

[21] Appl. No.: 09/028,617

[22] Filed: Feb. 24, 1998

Related U.S. Application Data

[60] Provisional application No. 60/038,474, Feb. 24, 1997.
[51] Int. Cl.$^6$ ........................................................ B62J 1/00
[52] U.S. Cl. ........................................ 297/202; 297/195.1
[58] Field of Search ................................ 297/195.1, 201, 297/202, 452.23, 452.25

[56] References Cited

U.S. PATENT DOCUMENTS

| | | |
|---|---|---|
| 4,451,086 | 5/1984 | Seven . |
| 5,123,698 | 6/1992 | Hodges . |
| 5,203,606 | 4/1993 | Granzotto . |
| 5,709,430 | 1/1998 | Peters . |
| 5,725,274 | 3/1998 | Bergmeister . |

*Primary Examiner*—Milton Nelson, Jr.

[57] ABSTRACT

A bicycle saddle includes two support members preferably supported by a base component which connects the saddle to a bicycle. The support members are positioned on the base component in a laterally spaced apart arrangement about a longitudinal axis of the saddle, leaving an open area between the support members. Each support member includes a nose portion and a back portion. The back portion includes a downwardly sloped front surface and a downwardly sloped aft surface. The front and aft surfaces meet at a ridge or transition surface which is preferably swept rearwardly along with the front surface. The nose portion of each support member extends from an inside edge of the front surface forwardly and generally parallel to the longitudinal axis of the saddle. In this configuration, the saddle supports the cyclist at the tuberosities of the ischium, along the junction of the back of the thigh and the buttocks, and somewhat along the junction of the inner thigh and the torso. The saddle removes substantially all weight from along the perineal opening of the cyclist's pelvic bone.

14 Claims, 3 Drawing Sheets

BICYCLE SADDLE

This application claims the benefit of U.S. Provisional Application No. 60/038,474 filed Feb. 24, 1997, which is incorporated herein by reference.

BACKGROUND OF THE INVENTION

The invention relates to bicycle saddles and more particularly, to a bicycle saddle adapted for comfortable road cycling. The invention also encompasses a method of supporting the cyclist on the bicycle with increased comfort and without interfering with the pedalling motion.

Numerous bicycle saddle or seat designs address the problem of providing comfortable support for the cyclist. Despite literally hundreds of designs over the past one hundred years or more, modern bicycle saddles remain the same. Saddles commonly include a long narrow nose, gradually widening to a rear portion. The cyclist straddles the saddle and the saddle provides support generally along the perineal opening of the ischium or pelvic bone. Various types of padded coverings or even suspensions may be added to this basic saddle design, however, these coverings or suspensions do not alter the basic manner in which the saddle provides support.

The problem with the standard saddle design is readily apparent to anyone who has spent much time on a bike. Concentrating the weight of the body along a narrow area traversing the perineal opening is at best woefully uncomfortable, and at worst simply unhealthy. The problem is accentuated when cycling long distances, requiring the cyclist to be on the bike for extended periods. The concentration of weight along the perineal opening for extended periods of time can cause penile numbness in male cyclists and can lead to very serious health problems.

One solution which has been pursued for many years is simply to support the body more laterally of the perineal opening, at the buttocks and upper thigh. However, a wide "tractor type" seat which supports the buttocks also interferes with the movement of the legs in the pedalling motion. Wide seats are thus not acceptable to serious cyclists who demand maximum performance.

Other saddled designs include a standard saddle shape but with a cut-out or indentation positioned in the middle of the saddle. The cut-out or indentation corresponds roughly to the area of the saddle adjacent to the perineal opening. The purpose of the cut-out or indentation is to relieve pressure along the perineal opening. However, these cut-out or indentation type saddles simply remove support area and provide no alternative support arrangement.

U.S. Pat. No. 4,387,925 discloses a bicycle saddle which attempts to solve the problem of interference with the pedalling motion by providing two separate seat elements which may pivot as the cyclist pedals. The seat elements each include a downwardly curved front portion and cup shaped rear portions. The cup shaped rear portions are shaped to accept the buttocks and the front portion is adapted to support the rear of the thigh.

Although the two laterally spaced seat elements disclosed in the U.S. Pat. No. 4,387,925 Patent certainly provide a larger area for support and eliminate pressure along the perineal opening, they do not allow for a smooth pedalling motion. When the front of one of the seat elements pivots down, the rear pivots up. However, the body does not move in this fashion. When the leg moves downwardly in the pedalling stroke, the buttocks does not pivot upwardly. Rather, the buttocks and pelvic bone should remain substantially stationary as the legs move in the pedalling motion.

SUMMARY OF THE INVENTION

It is an object of the invention to provide a bicycle saddle which supports the cyclist in a comfortable position for extended periods without interfering with pedalling. Another object of the invention is to provide a method of supporting a cyclist in a comfortable and efficient cycling position.

These objects are accomplished with a saddle having a base component and two separate support members which connect to the base component. The support members include a particular shape to support the cyclist at the tuberosities of the ischium, along the area generally defined by the junction of the buttocks and the back of the upper thigh, and along the junction of the inner thigh and torso. The support members are spaced apart laterally so that substantially no body weight is applied along the perineal opening.

The support members each include a back portion and a nose portion. The back portion includes a front surface angled downwardly at a steep angle with respect to horizontal, and an aft surface which also extends downwardly with respect to horizontal. The front and aft surfaces meet at a ridge or transition area which extends generally laterally but is swept rearwardly at a substantial angle. Also, the front and aft surfaces extend upwardly in a shallow V shape when viewed from the font of the saddle.

This support member shape and arrangement allows the members to support the cyclist generally at the tuberosities of the ischium and along the junction of the buttocks and upper thigh, and the junction of the inner thigh and torso. The rearward sweep of the ridge and front surface allows natural movement of the upper leg in the pedalling motion while the inner part of the aft surface supports the pelvic bone.

DESCRIPTION OF THE PREFERRED EMBODIMENTS

Figure 1:
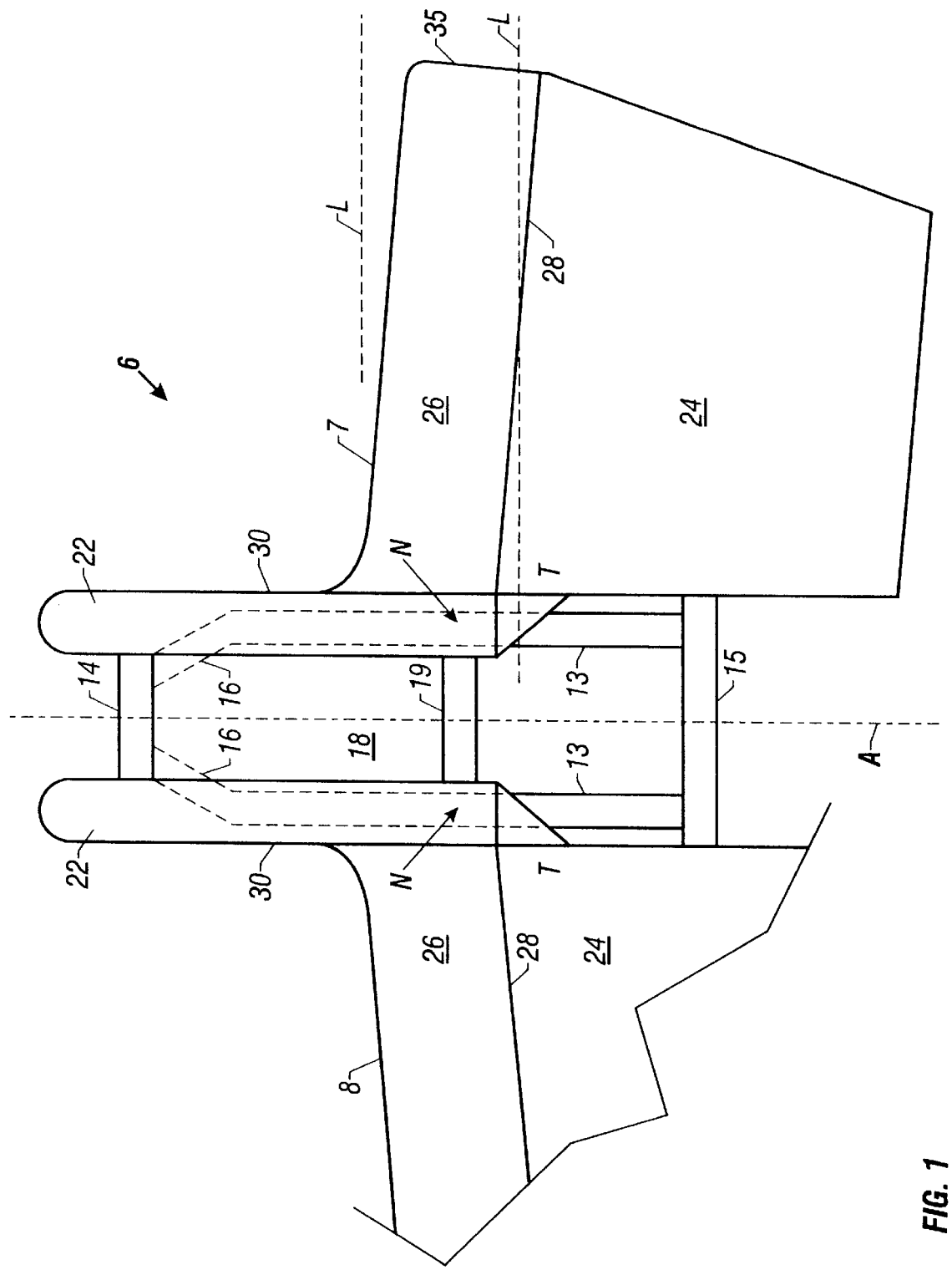
FIG. 1 is a partial top view of a bicycle saddle embodying the principles of the invention.
Figure 2:
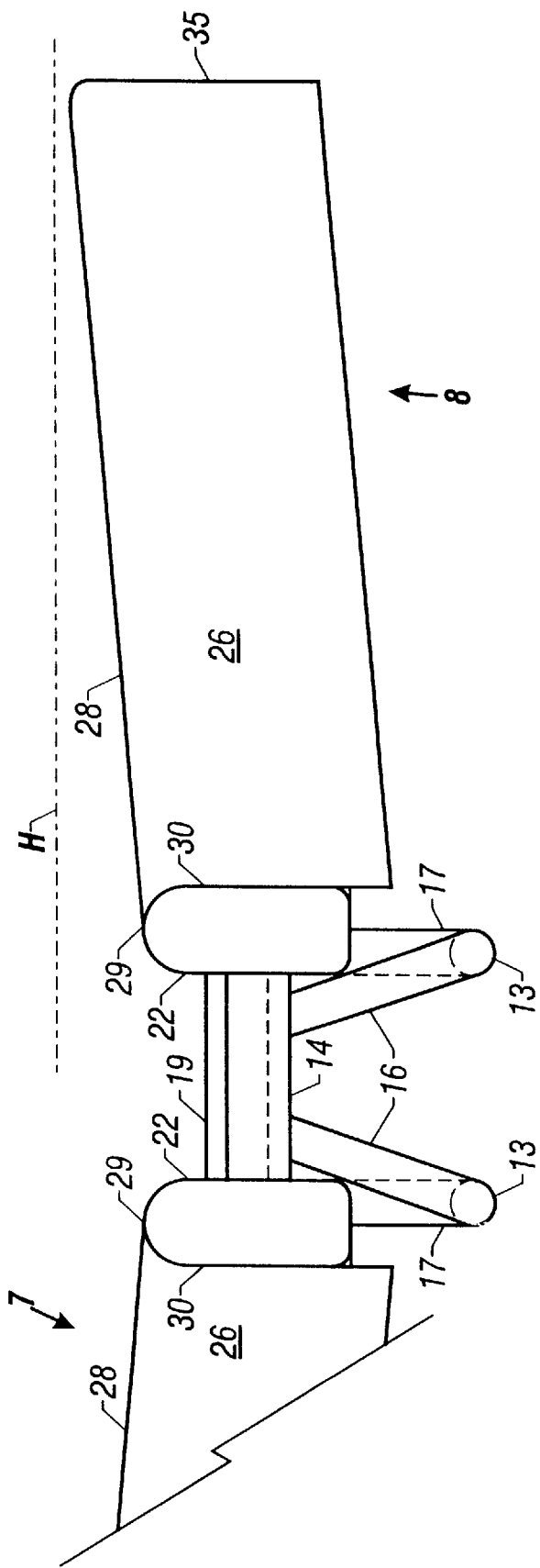
FIG. 2 is a partial front view of the bicycle saddle shown in FIG. 1.
Figure 3:
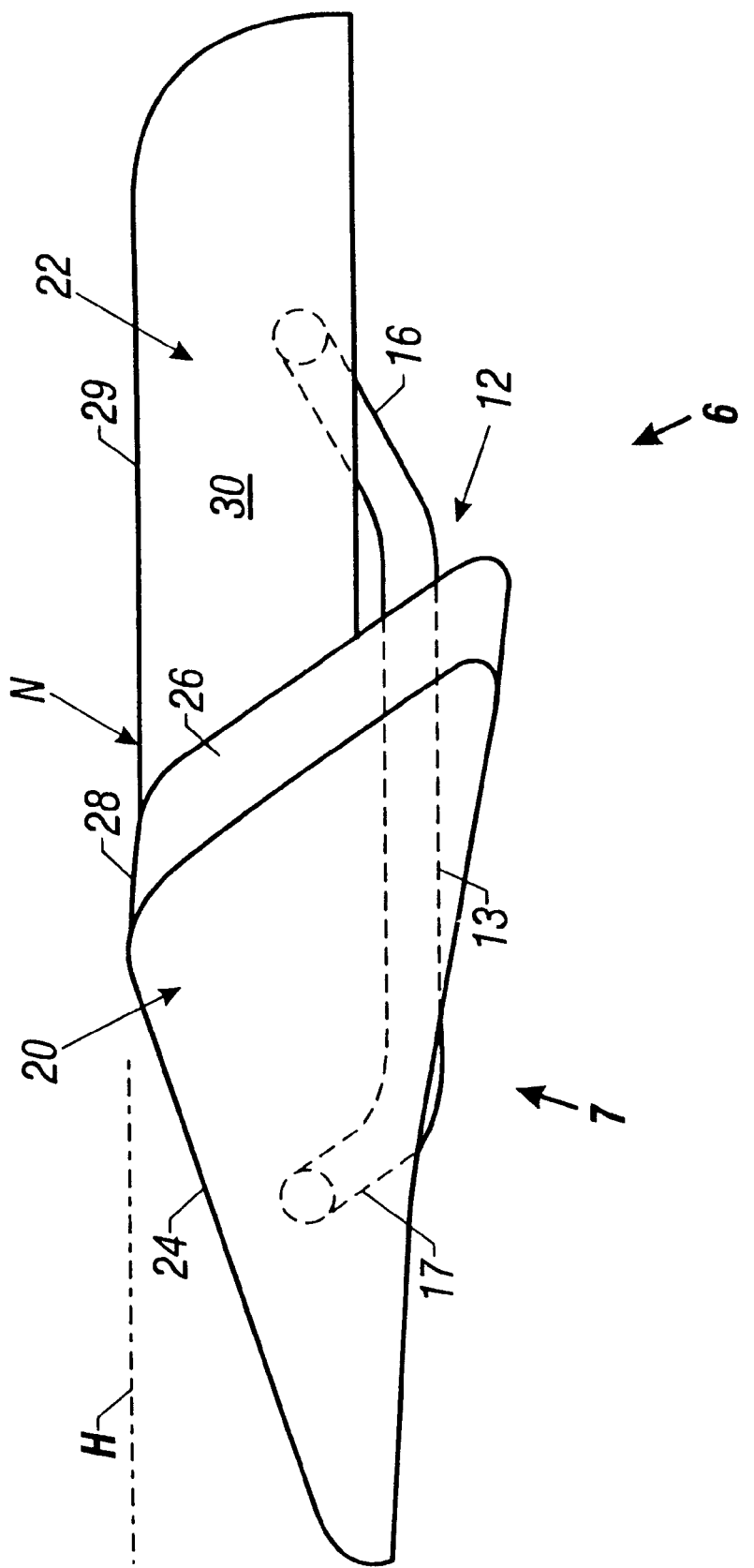
FIG. 3 is a right side view of the bicycle saddle shown in FIG. 1.

FIGS. 1 through 3 show one preferred form of saddle 6 embodying the principles of the invention. The saddle 6 includes two support members 7 and 8 and a base component. The base component includes two elements. First, the base component includes seat post securing means for enabling the saddle to be secured to the bicycle (not shown). Second, the base component includes means for connecting the support members 7 and 8 in place.

The illustrated base component includes rails 12 with a parallel section 13 which may be secured to a standard bicycle seat post clamp (not shown). In the embodiment shown in the Figures, a front cross member 14 and aft cross member 15 connects the support members 7 and 8 to the rails 12. Both the front and aft cross members 14 and 15, respectively, extend generally perpendicular to the parallel section 13 of the rails 12.

The base component also includes a front riser portion 16 and an aft riser portion 17 associated with each rail 12 which extend upwardly from the parallel section 13 to the cross members 14 and 15. These riser portions 16 and 17 are preferably integrally formed with the parallel sections 13. The preferred rials 12 and cross members 14 and 15 may be welded or otherwise rigidly connected together and may be formed from any suitable material providing the required strength, rigidity, and durability. For example, each rail 12 and the cross members 14 and 15 may be formed from a steel alloy such as chrome molybdenum steel, aluminum or aluminum alloy, vanadium, or titanium or titanium alloy. The rails 12 and cross members 14 and 15 may alternatively be formed from a composite material.

The rails 12 may, for example, comprise small diameter rods with the parallel sections 13 being approximately four to six inches in length. Although the parallel sections 13 need not be this long, the added length over that required to accommodate a seat post clamp allows for some forward/aft adjustability to suit the particular cyclist.

Although the form of the base component shown in the Figures is preferred for its strength, adjustability, and ease of manufacture, those skilled in the art will readily envision many other arrangements which are securable to a bicycle seat post and can provide support for the support members 7 and 8 according to the invention.

The two support members 7 and 8 are connected to the base component with the cross members 14 and 15. An additional cross member 19 may also be used to connect the support members. As shown in FIGS. 1 and 2, the support members 7 and 8 are fixed in a laterally spaced apart relationship with an open area 18 there between. In the preferred form of the invention, the support members 7 and 8 are adjustably connected to the cross members 14, 15, and 19 to allow for adjustment in the width of the open area 18 to suit the particular cyclist.

The support members 7 and 8 are mirror likenesses of each other, and thus the following description will discuss one of the support members, and the description will apply equally to the support member not specifically identified. Referring particularly to FIGS. 1 and 3, the right support member 7 (right when viewed from behind the saddle and corresponding to the cyclist's right leg) includes a back portion 20 and a nose portion 22. The back portion 20 includes a top surface having an aft surface 24 and a front surface 26. The front surface 26 extends downwardly at an angle generally in the range of 35° to 65° to horizontal H. The aft surface 24 extends downwardly at an angle in the range of 10° to 30° to horizontal H. A rounded transition surface 28 extends between the aft surface 24 and front surface 26. This transition surface 28 forms a ridge which extends the entire width of the support member 7.

The nose portion 22 of each support member extends forwardly from an inside edge of the front surface 26 of the respective support member. Both nose portions 22 extend preferably generally parallel to a longitudinal axis of the saddle 6. The nose portions 22 include a narrow, rounded top surface 29 and a wide generally planar side surface 30. When the cyclist is properly seated in the saddle 6, the nose portions 22 provide support generally at the junction of the cyclist's inner thigh and torso with the inner thigh adjacent to the side surface 30 throughout the pedalling stroke.

The support member 7 may be produced from substantially any material which will produce the generally rigid upper surface comprising the nose portion 22, the aft surface 24, front surface 26, and transition surface 28, and accept the cross members 14 and 15. For example, the illustrated support member 7 includes a foam material core with a skin of plastic or composite material. Also, although not shown in the drawing, the support member 7 may include a layer of padding material such as a resilient foam plastic, transversely resilient fabric, or stabilized gel positioned on the upper surface, and particularly along the transition surface 28 and at least an inner area T of the aft surface 24. A suitable covering material (not shown) may be secured over this padding material.

Referring to FIG. 1, the support members 7 and 8 are mounted on the base component with the front surface 26 facing forward. The front edge of the front surface 26 as well as the ridge which comprises the transition surface 28 is swept rearwardly at an angle of between 5° and 40° with respect to a line L extending perpendicular to a longitudinal axis of the saddle 6. The most preferred angle of rearward sweep is between 10° and 20°.

Referring now to FIG. 2, the preferred support members 7 and 8 are also swept upwardly toward their outside edge 35, distal to the base component rails 12. The angle of upward sweep may be in the range of 0° to 25° and preferably between 5° and 15° with respect to horizontal H.

The use and operation of the saddle 6 according to the invention may now be described with reference to the Figures. The support member 7 is adapted to support the cyclist at their right side while the support member 8 is adapted to support the cyclist at their left side. The ridge comprising the transition surface 28 provides support generally along the crease of the body at the junction of the buttocks and the upper thigh. A small portion of the upper thigh, approximately two to three inches in length preferably, is in contact with the front surface 26 of each support member. This contact provides some support for the cyclist. However, most of the cyclist's weight is borne along the ridge comprising the transition surface 28 and in the area T immediately behind the transition surface at the inside or proximal portion of the support member aft surface 24. The area T aligns generally with the tuberosities of the ischium when the cyclist is properly seated in the saddle 6. Additionally, some of the cyclist's weight is borne by the top 29 of each nose portion 22 and particularly the part of the nose portion shown at N adjacent to the front surface 26. The support provided by the nose portions 22 is generally at the junction of the inner thigh and torso, or generally at the groin. The support provided by the nose portions 22 is important for preventing the cyclist from sliding forward or placing too much weight forward to be supported ultimately by the cyclist's arms on the bicycle handlebar.

The rearward sweep of the support members 7 and 8 toward the outside or distal edge 35 thereof helps prevent interference with the pedalling stroke. The rearward sweep places the outside or distal area of the front surface 26 relatively further to the rear than the inside area of the front surface. This outside or distal area of the support member aligns generally with the cyclist's femur, and the more rearward position of this distal area reduces or eliminates any tendency of the body to move forward due to leveraging by contact between the back surface of the thigh and the support member at a point in front of the pivot axis of the femur. That is, the rearward sweep of the support member places the front surface 26 of the support member close enough to the pivot axis of the femur to prevent excessive force between the rear surface of the cyclist's upper thigh and the support member as the leg moves from the top of the pedalling stroke to the bottom. However, the inner or proximal area T remains forward and in position to support the cyclist at the tuberosity of the ischium.

Referring to FIG. 2, the upward sweep of the upper surface of the support members 7 and 8 provides a better distribution of the cyclist's weight across the width of the support members. Since the more lateral area at the rear of the upper thigh contours somewhat upwardly, the upward sweep follows the contour, preventing the inner portion of the support member from taking all of the cyclist's weight.

Although the illustrated form of the invention represents a preferred embodiment of the saddle, those skilled in the art will readily recognize numerous variations consistent with the principles of the invention. For example, although the drawings show the front surface 26 and aft surface 24 as generally planar surfaces, the surfaces need not be planar. The area T, for example, may comprise a dimple corresponding generally to the shape of the tuberosity of the ischium, or a raised area with additional padding. Also, the ridge comprising the transition surface 28 may not extend linearly as shown at R in FIG. 8. Rather, the ridge may be curved rearwardly toward the outside of the support member. For example, the inner portion of the ridge may form the leading rim of a dimple corresponding to the tuberosity of the ischium and may extend along a tangent to the dimple rearwardly toward the outside area of the support member. Also, the upward sweep of the support member may include a curve to better conform to the area behind the upper thigh and the buttocks. Furthermore, the support members may narrow more or less than shown in FIG. 1 by the rearwardly tapered outer edge 35.

The dimensions of the support members 7 and 8 may vary to suit the particular cyclist. For example, the overall width of each support member may be approximately 5.5 inches, while the overall length may be 5 to 6 inches. The length of the front surface 26 of each support member may preferably be 2 to 3 inches as measured from the transition surface 28 to the lowermost edge of the front surface. The support members 7 and 8 may be spaced apart approximately 2 inches. Preferably, the support members 7 and 8 are adjustable on the cross members 14, 15, and 19 to vary the spacing to suit the particular cyclist.

I claim:

1. A bicycle saddle comprising:
   (a) a first support member;
   (b) a second support member, the second support member being supported in a laterally spaced apart relationship to the first support member about a saddle longitudinal axis;
   (c) the first and second support members each including a front support surface extending downwardly toward a front of the saddle at an angle to horizontal, an aft support surface extending downwardly toward the rear of the saddle at an angle to horizontal, and a transition support surface forming a ridge at the junction of the front support surface and the aft support surface; and
   (d) the first and second support members also each including a nose portion extending forwardly from an inside edge of the respective front surface and from an inside edge of the respective transition support surface.

2. The bicycle saddle of claim 1 wherein the first and second support members each extend upwardly laterally from the saddle longitudinal axis.

3. The bicycle saddle of claim 1 wherein the first and second support members are spaced apart approximately two inches leaving an open area there between.

4. The bicycle saddle of claim 1 wherein:
   (a) the transition support surface and the front support surface of each support member both extend rearwardly at a swept back angle to a plane extending perpendicular to the longitudinal axis of the saddle.

5. The bicycle saddle of claim 4 wherein the swept back angle is in a range of 5 to 25 degrees.

6. The bicycle saddle of claim 1 wherein each nose portion includes a substantially vertical outside surface.

7. The bicycle saddle of claim 6 wherein each nose portion includes a top surface forming a ridge which substantially intersects the respective transition support surface, and wherein the nose portions are laterally spaced apart leaving an open space there between.

8. A method for supporting a cyclist on a cycling saddle, the method comprising the steps of:
   (a) supporting the cyclist on a right side of the body with a right ridge support surface, the right ridge support surface extending along a path from a point forward of the right tuberosity of the ischium and from that point laterally at a swept back angle with respect to a plane perpendicular to a longitudinal axis of the saddle;
   (b) supporting the cyclist on the right side with a right aft support surface, the right aft support surface sloping downwardly from the right ridge support surface toward a rear of the saddle;
   (c) supporting the cyclist on a left side of the body with a left ridge support surface, the left ridge support surface extending along a path from a point forward of the left tuberosity of the ischium and from that point laterally at the swept back angle with respect to a plane perpendicular to the longitudinal axis of the saddle;
   (d) supporting the cyclist on the left side with a left aft support surface, the left aft support surface sloping downwardly from the left ridge support surface toward the rear of the saddle;
   (e) supporting the cyclist additionally generally at the junction of the cyclist's right inner thigh and torso and generally at the junction of the cyclist's left inner thigh and torso; and
   (f) providing an open area along the longitudinal axis of the saddle, the open area corresponding to a central portion of the perineal opening of the cyclist's pelvic bone.

9. The method of claim 8 wherein the swept back angle is in a range of 5 to 25 degrees.

10. The method of claim 8 further comprising the steps of:
    (a) supporting the cyclist on the right side with a right front support surface, the right front support surface extending downwardly from the right ridge support surface toward a front of the saddle; and
    (b) supporting the cyclist on the left side with a left front support surface, the left front support surface extending downwardly from the left ridge support surface toward a front of the saddle.

11. In a bicycle saddle having a central opening adapted to align generally with a central portion of a perineal opening of a cyclist's pelvic bone, the improvement comprising:
    (a) a right ridge support surface extending laterally on a right side of the saddle at a swept back angle with respect to a plane perpendicular to a longitudinal axis of the saddle;
    (b) a left ridge support surface extending laterally on a left side of the saddle at the swept back angle with respect to a plane perpendicular to the longitudinal axis of the saddle;
    (c) a right aft support surface positioned toward a rear of the saddle with respect to the right ridge support surface, the right aft support surface including a surface adapted to align generally with the right tuberosity of the cyclist's ischium when the cyclist is seated on the saddle;

(d) a left aft support surface positioned toward the rear of the saddle with respect to the left ridge support surface, the left aft support surface including a surface adapted to align generally with the left tuberosity of the cyclist's ischium when the cyclist is seated on the saddle;

(e) a right nose portion extending forwardly from an inside edge of the right ridge support surface; and (f) a left nose portion extending forwardly from an inside edge of the left ridge support surface.

12. In the bicycle saddle of claim 11, the swept back angle comprising an angle in the range of approximately 5 to approximately 25 degrees.

13. In the bicycle saddle of claim 11, the improvement further comprising a substantially vertical outside surface on the right nose portion and a substantially vertical outside surface on the left nose portion.

14. In the bicycle saddle of claim 13, the improvement further comprising:

(a) a right top support surface of the right nose portion, the right top support surface forming a ridge which substantially intersects the right ridge support surface; and (b) a left top support surface of the left nose portion, the left top support surface forming a ridge which substantially intersects the left ridge support surface; and (c) wherein the right and left nose portions are laterally spaced apart leaving an open space there between.

* * * * *